A. H. HEYROTH.
TELEMOTOR.
APPLICATION FILED FEB. 25, 1921.
1,414,018.
Patented Apr. 25, 1922.
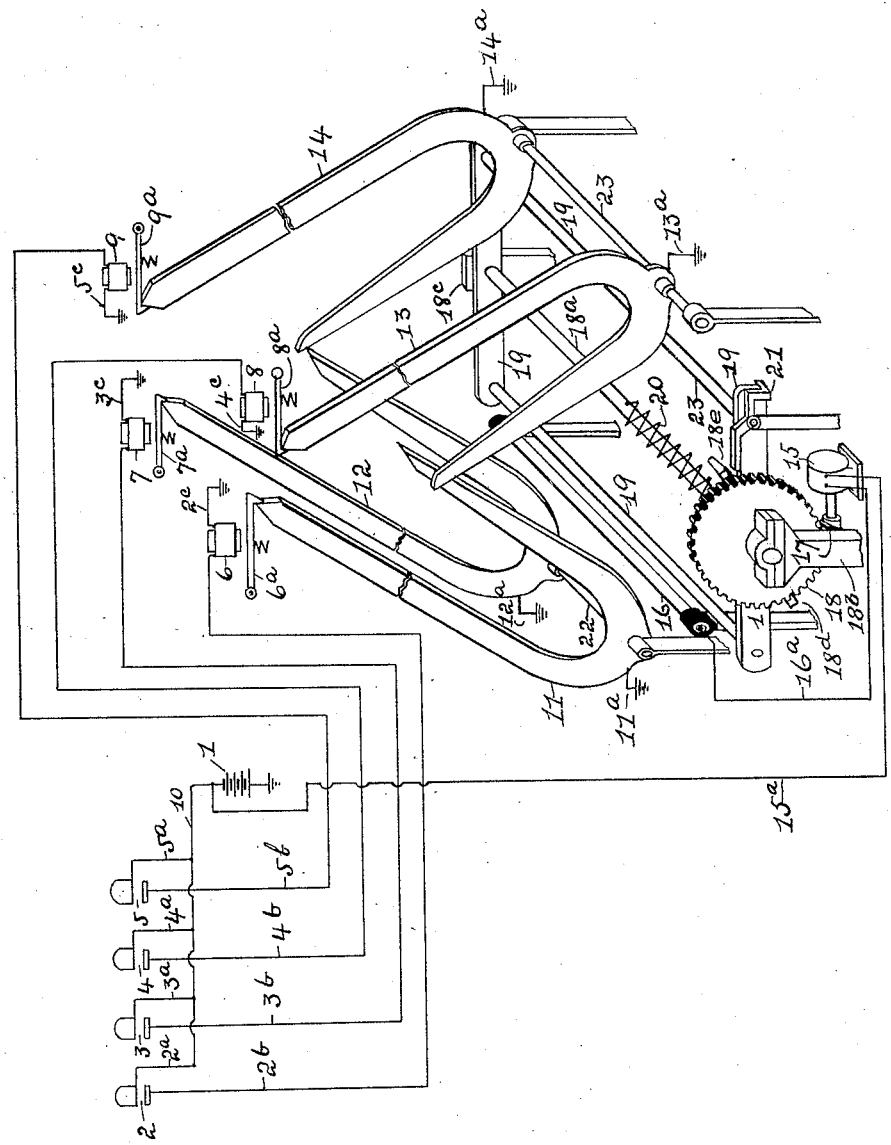
Witnesses
a. m. Loveland
E. M. Ibsen
INVENTOR
Albert H. Heyroth
BY James F. Watson
ATTORNEY

UNITED STATES PATENT OFFICE.

ALBERT H. HEYROTH, OF DULUTH, MINNESOTA.

TELEMOTOR.

1,414,018.   Specification of Letters Patent.   Patented Apr. 25, 1922.

Application filed February 25, 1921. Serial No. 447,823.

*To all whom it may concern:*

Be it known that I, ALBERT H. HEYROTH, a citizen of the United States, residing at Duluth, in the county of St. Louis and State of Minnesota, have invented certain new and useful Improvements in Telemotors, of which I do declare the following to be a specification.

My invention relates to electric telemotors, and has for its object the provision of a simple and effective telemotor, or electric time switch circuit system, in which a master controlling circuit is adapted to initiate the operation of a motor circuit, which is adapted to continue in operation for a predetermined time after the master controlling circuit has ceased to operate, and until the motor circuit is opened by means automatically operated by said motor, one of said circuits being adapted to govern the operation of exterior mechanical devices.

With this and other objects in view, my invention consists of the constructions, combinations and arrangements of parts hereinafter described and claimed.

In the drawings, the figure is a perspective view partly in diagram of the preferred form of my said invention.

In the drawings are shown a plurality of masters controlling circuits in parallel, comprising a source of electricity of any suitable type or structure, as a battery 1; a normally open contact in each circuit, as respectively, the contacts 2, 3, 4 and 5; the coil of an electro-magnetic device in each circuit; as respectively of electro-magnets 6, 7, 8, and 9, and suitable circuit wires for each of said circuits, as the wire in common 10, respective wires $2^a$, $3^a$, $4^a$, and $5^a$; respective wires $2^b$, $3^b$, $4^b$, and $5^b$; and ground wires $2^c$, $3^c$, $4^c$, $5^c$. Each of said magnets is provided with an armature, as $6^a$, $7^a$, $8^a$, and $9^a$, respectively. If desired said armatures are connected in any suitable manner, or by any suitable means, or engaged with mechanical devices of any desired character adapted to be governed by said armatures as semaphore arms 11, 12, 13 and 14 respectively.

In the present form of my said invention, said semaphore arms are included in a plurality of normally open motor circuits, each dependent for initiation of its operation upon the operation of a corresponding one of said masters control circuits. Each of said motor circuits comprises said source of electricity, a motor 15, common to all of said motor circuits, an insulated collector rail 16 common to all of said circuits, a corresponding one of said semaphore arms, and circuit wires $15^a$, $16^a$, $11^a$, $12^a$, $13^a$ and $14^a$. Said motor, by any suitable transmission, as by a worm 17 and worm wheel 18, is adapted to rotate a frame 19 which is journalled upon the worm wheel axle $18^a$, which is journalled in any suitable stationary bearings, as $18^b$, $18^c$. Said frame is anchored to said axle by a spring 20 which is attached at one end to said frame and is coiled around said axle and secured at its opposite end thereto. Said frame is normally prevented from rotating by a latch 21 pivotally mounted upon any suitable stationary support adjacent to said frame and adapted at one end to engage said frame and at its opposite end to engage either of two fingers $18^d$ and $18^e$ extending from said worm wheel. It will be obvious that said frame may be put under initial spring tension by holding said latch out of engagement and rotating said frame, and that thereafter the rotating of said axle in the normal direction by means of said worm wheel while said latch is in engagement with said frame will increase or restore the tension of said spring. It will be clear also that when one of said fingers at each half revolution of said worm wheel engages and trips said latch, said frame will by means of said spring be suddenly turned one half revolution and will be caught and held again by the latch which will have returned to normal position following the passing of said finger.

Said rail 16 extends parallel with and adjacent to said frame, and said semaphore arms are journalled at their lower ends upon any suitable pivots, as 22, 23, extending parallel to said frame. Each of arms are adapted to be held in normally retracted position out of contact with said rail 16, by a corresponding one of said armatures, and is adapted to be released by said armature and to fall in circuit closing position across said frame 19 and across and in circuit-closing contacts with said rail 16 when the corresponding master control circuit is closed. When any of said arms has fallen into contact with said rail 16, the motor circuit will thereby be closed and the worm wheel will commence slowly to revolve. Meanwhile the signal exhibited or governed by said arm will be displayed. The master control circuit may be immediately reopened without affecting the operation of the motor circuit. The time during which any of said arms will remain in operative position is predetermined by adjusting the speed ratio of the motor and transmission to effect a half revolution of the worm wheel 18 in a period corresponding to the time desired for the display of the signal. When said finger trips said latch, said frame suddenly turns a half revolution under the impulse of said spring, which movement of said frame operates to throw the operating semaphore arm upward into retracted position, its upper end being caught or engaged by the corresponding armature operating as a holding latch. Upon such semaphore arm being retracted, the motor circuit is thereby opened and the motor stops.

When used in connection with automobiles one or more of said arms are preferably arranged to fall in one direction across said frame and others to fall in the opposite direction, and when so used said arms may be marked or otherwise right, left, stop, back, respectively to indicate the direction or position which the automobile is about to take. Any number of said arms may be used, and it is not generally essential that they be arranged to fall in opposite directions. In operation all of said arms except the one in operation may if desired be screened from view by any suitable structure or wall (not shown), having slot formed therein to disclose the operating arm. It will be obvious, however, that said arms may be employed for other or different purposes than signal arms, and that said structure may be altered or modified in various particulars within the spirit and scope of my claims.

What I claim is:

1. The combination of an electric circuit comprising a source of electricity, a normally open contact, and the armature of an electric motor; a second electric circuit comprising said source, a normally open contact and the coil of an electro-magnetic translation device; an armature for said translation device; a manually operatable circuit closer for said second circuit; a circuit closer for said first circuit adapted to be held in normally retracted position by said armature when said first circuit is open; a spring actuated rotary frame for returning the circuit closer of said first circuit to retracted position; a latch for normally preventing the rotation of said frame; and means adapted to be operated by said motor to wind said spring and to release said second latch.

2. The combination of an electric circuit comprising a source of electricity, a normally open contact, and the armature of an electric motor; a second electric circuit, comprising said source, a normally open contact, and the coil of an electro-magnet; an armature for said magnet; a manually operatable circuit closer for said second circuit; a circuit closer for said first circuit adapted to be held in normally retracted position by said armature when said second circuit is open, and to be released thereby when said second circuit is closed; a spring actuated rotary frame for returning the circuit closer of said first circuit to retracted position; a latch for normally preventing the rotation of said frame and for interrupting the rotation thereof at each half revolution; and means adapted to be operated by said motor to wind said spring and to release said latch.

In testimony whereof, I hereunto affix my signature, in presence of two witnesses.

ALBERT H. HEYROTH.

Witnesses:
ALICE LOUBERT,
F. M. McKAY.